Aug. 9, 1938.   L. RANNEY   2,126,575
METHOD OF AND APPARATUS FOR RECOVERING WATER FROM AND
SUPPLYING WATER TO SUBTERRANEAN FORMATIONS
Filed June 7, 1935   3 Sheets-Sheet 1
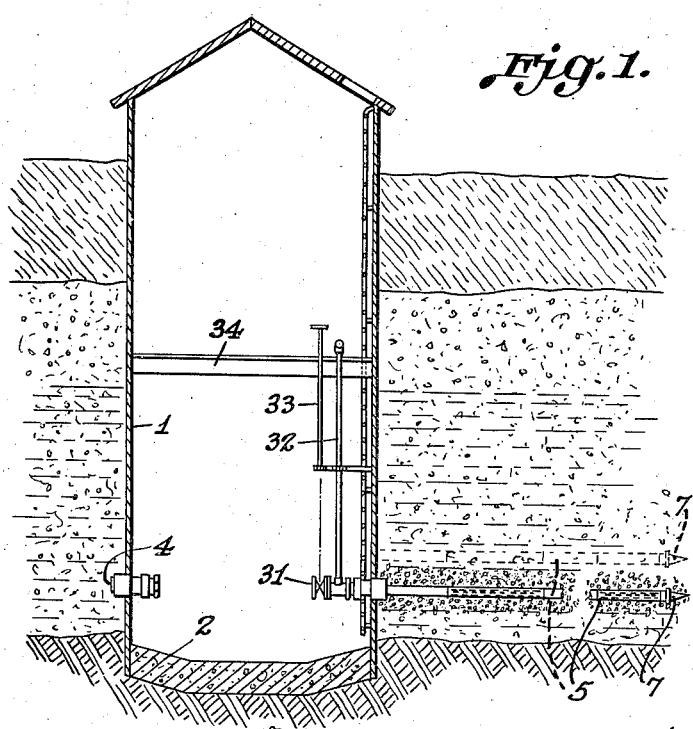
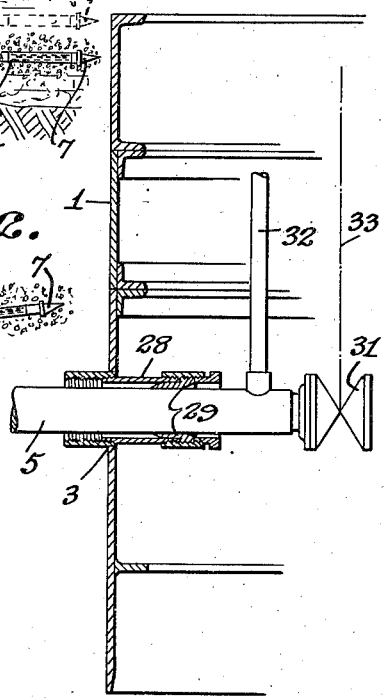
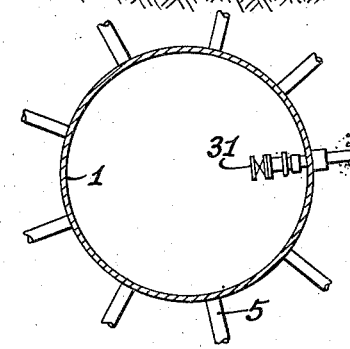
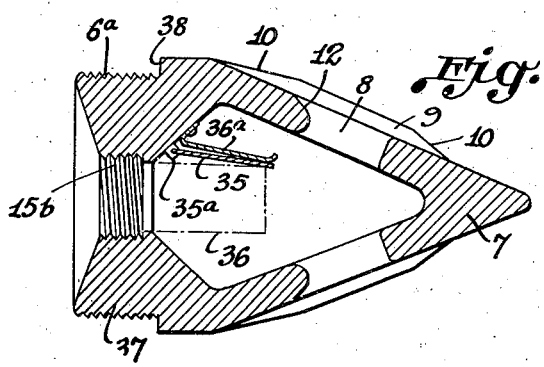
Inventor:
Leo Ranney

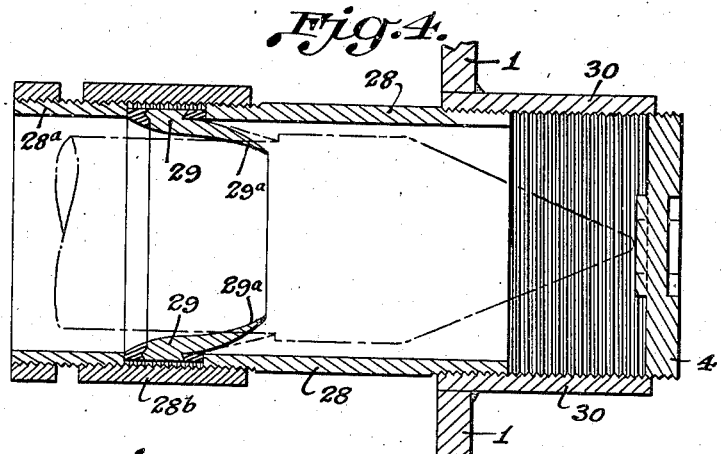
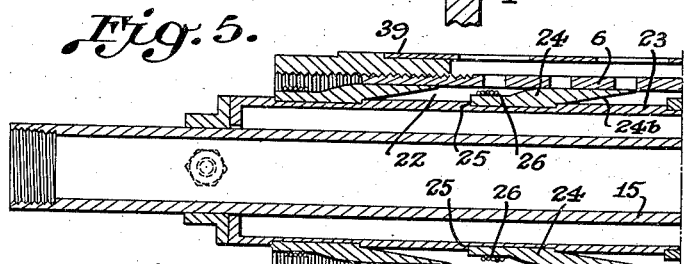
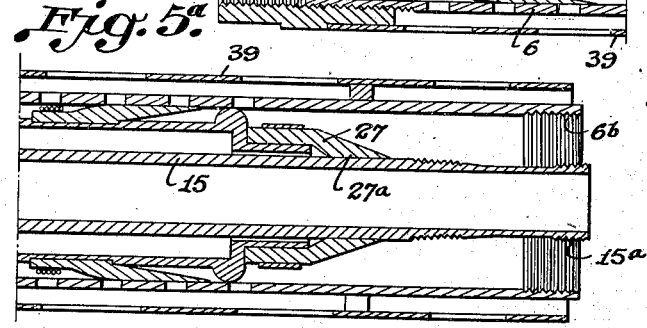
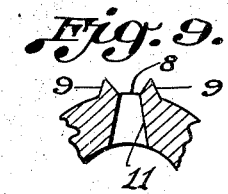
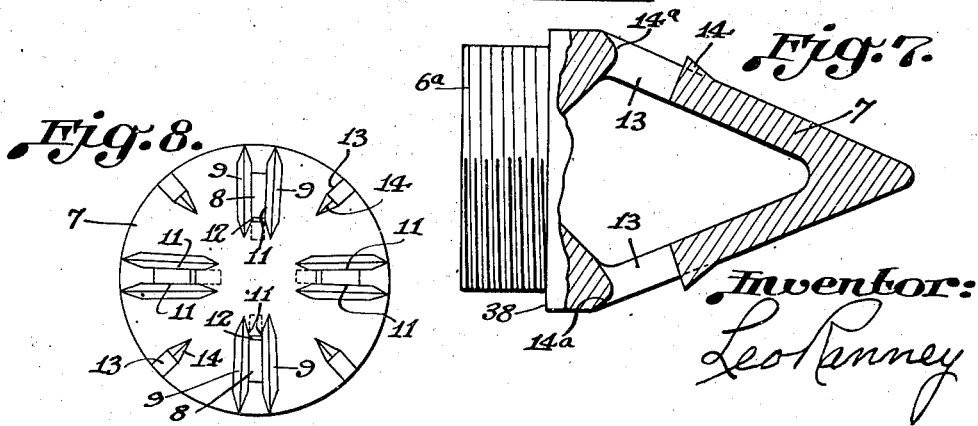

Aug. 9, 1938.   L. RANNEY   2,126,575
METHOD OF AND APPARATUS FOR RECOVERING WATER FROM AND
SUPPLYING WATER TO SUBTERRANEAN FORMATIONS
Filed June 7, 1935   3 Sheets-Sheet 3
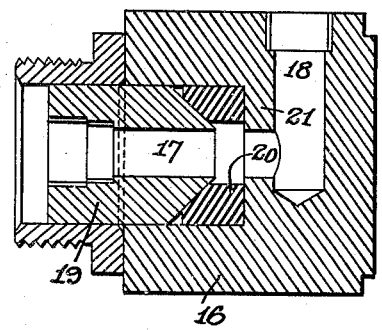
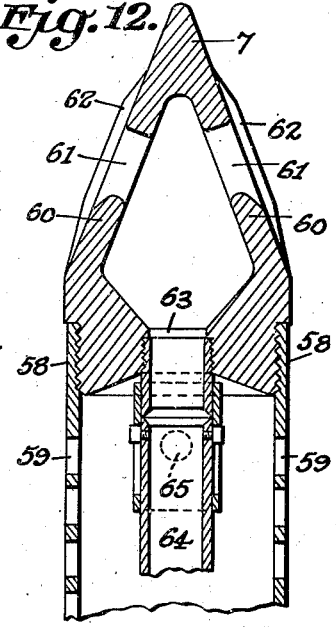
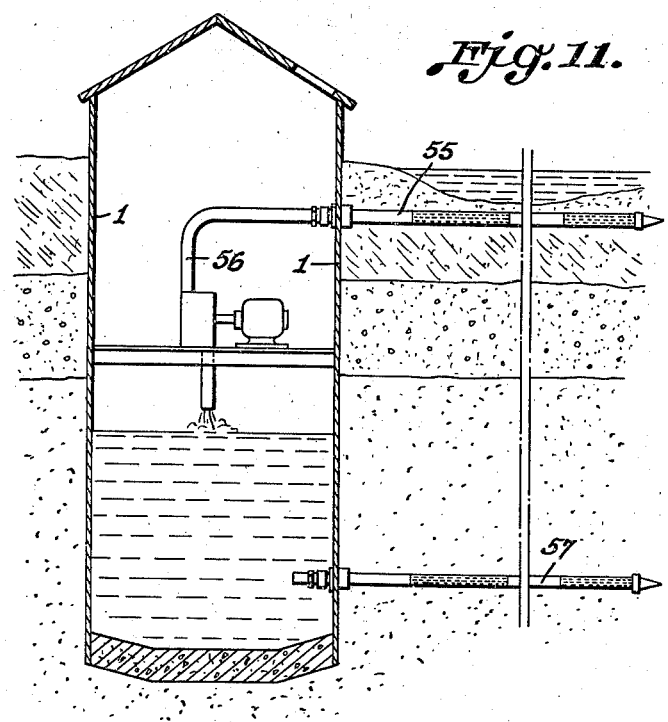

Patented Aug. 9, 1938

2,126,575

UNITED STATES PATENT OFFICE 2,126,575

METHOD OF AND APPARATUS FOR RECOVERING WATER FROM AND SUPPLYING WATER TO SUBTERRANEAN FORMATIONS

Leo Ranney, Massillon, Ohio

Application June 7, 1935, Serial No. 25,482
In Great Britain July 23, 1934

24 Claims. (Cl. 166—1)

This invention relates to methods of and installations for recovering water from subterranean formations or for replenishing or supplying the subterranean formations with water, and the invention has for its object to provide improved methods and installations for carrying this out effectively and economically.

The invention comprises an installation for the recovery of water from or for the supply of water to a subterranean formation comprising a shaft extending into the subterranean formations and affording access to the latter at a plurality of points and means for individually controlling the withdrawal or supply of water from or to such points of access.

The invention also comprises an installation according to the preceding paragraph wherein each means of access to the subterranean formations is provided with means for back-washing the same for cleansing purposes.

The invention also comprises an installation according to either of the two preceding paragraphs wherein the said means consist of perforated tubes projected radially with respect to the axis of the shaft and/or perforated cells disposed longitudinally around the shaft.

The invention also comprises a method of conserving water supplies which consists in transferring water from a surface or other water bearing stratum from which the water would ordinarily be lost by flow or evaporation or other causes to a deeper stratum in which it may be conserved for use and is characterized by the utilization of a part of the head between the two strata for generating a supply of power.

Apparatus for carrying out this method comprises a collecting pipe in the surface or other stratum from which the water is to be transferred, a delivery pipe conveying the water from such collecting pipe to a shaft by which the water is conveyed to the lower stratum and a water turbine or like apparatus arranged at some point in the path of the water delivered to said shaft for generating a supply of electric power.

The invention also consists in the further features hereinafter described or indicated.

In the accompanying drawings:—

Figure 1 is a diagrammatic sectional view of an installation according to the invention.

Figure 2 is a plan of Figure 1.

Figure 3 is a fragmentary view of a detail of Figure 1 on an enlarged scale.

Figure 4 is a longitudinal section of one of the stuffing boxes provided in the central shaft of Figure 1 for the projection of the collecting or discharge pipes.

Figure 5 and Figure 5a are fragmentary longitudinal sections of the collecting or discharge pipes employed in the installations according to Figure 1.

Figures 6 to 9 are views of the improved boring head provided in accordance with the invention.

Figure 10 is a section through a driving head employed for projecting the discharge or collecting head of Figure 1.

Figure 11 is a diagrammatic view of a plant according to the invention adapted to generate a source of electrical energy, and Figure 12 is a longitudinal section of a modified form of screening tube according to the invention.

In carrying the invention into effect in one convenient manner a hollow vertical shaft 1 (Figure 1) of relatively large diameter and open at both ends is sunk into the ground, and when the shaft has been sunk to the required depth the bottom thereof is sealed by, for example, a layer of concrete 2 and any water which may have collected in the shaft during the sinking operation is removed therefrom by pumping for instance.

The shaft may be built up in sections and may be lined with iron, concrete or other material which serves to strengthen and increase the weight of the shaft to facilitate the sinking thereof and the wall of the shaft is provided with one or more circumferential rows of openings 3, each row being preferably disposed in a plane perpendicular to the axis of the shaft, and the openings in one row being preferably arranged in staggered relationship with respect to the next row.

Each shaft opening is closed when the shaft is being sunk by, for instance, a plug or block 4 which can be pushed out when it is desired to open up communication between the shaft and the neighboring stratum, such, for instance, as gravel and sand, by means of collecting or distributing heads 5 of relatively small diameter which are projected laterally through the openings in the shaft so as to radiate from the centre of the latter and extend into the stratum or strata from which it is desired to obtain water or which it is desired to replenish or supply with water.

Each such head consists of an outer longitudinally perforated tube 6 (Figures 5 and 5a) which may be built up from sections coupled together from the inside of the shaft, by having screwed connections with each other for instance, and the forward end of such tube carries a boring head 7 (Figures 6 to 9) which is preferably of generally hollow conical formation and is slotted to permit fine material, such as sand, to enter the interior of the boring head during the boring operation.

The boring head may have a series of circumferential slots 8 near the pointed end thereof each of which slots may extend lengthwise of the boring head and be bounded upon each longitudinal side with a sharp longitudinal projecting ridge 9 provided upon the outside surface of the boring head. At its ends each ridge is reduced to the general level of the outer surface of the head by a gradual taper or slope 10. These ridges besides assisting in the boring operation also serve to lift the stones encountered during the boring operation and permit of the fine material, such as sand, to pass freely through the slots 8 into the interior of the boring head. The slots in the boring head may be formed with their side walls 11 (Figures 8 and 9) inclined so that the slots gradually widen from the outside of the boring head towards the inside thereof and also from the ends thereof next to the pointed end of the boring head towards the ends thereof remote from the said pointed end. The purpose of the former inclination of the longitudinal sides of the slots 8 is to facilitate the passage of the fine material into the interior of the boring head while the purpose of the latter inclination of these sides of the slots is to promote a passage of any stones which may lodge within the slots along the latter towards the wide end of the slots where the stones encounter an inclined surface 12 (Figure 6) provided at this end of each slot and which surface tends to lift the stones out of the way as the boring head is advanced. The boring head may also be formed with a further series of circumferential longitudinal slots 13 (Figure 7) nearer to the wide end of the boring head than the other slots and staggered with relation thereto. At the lower end of each of these further slots there is provided a ridge 14 projecting outwardly from the general level of the outer surface of the head, the side of the ridge facing towards the point of the head being formed as a gradual incline with respect to the surface of the head. This ridge serves to lift the gravel as the boring head is advanced and so promote a free passage of the sand through the top slots. The high end of each of these slots 13 may also be formed at the top thereof with an inclined surface 14 which tends to lift any stones which may lodge within the slots and which encounter this inclined surface as the boring head is advanced.

Water will also flow into the boring head with the fine material and during the projection of the perforated tube 6 an imperforate tube 15 is accommodated within and coaxial with the latter. This interior imperforate tube 15, which may also be built up from sections, is detachably connected at its forward end with the interior of the boring head 7 while its rear end extends into the central shaft 1 into which the sand and water is discharged from the said tube during the boring operation and pumped to the surface. This imperforate tube therefore serves for the removal of the fine material and the water (sand and water) which enters the boring head during the boring operation and when the boring operation has been completed, which will be when a sufficient length of perforated tube 6 has been projected from the central shaft, the imperforate interior tube 15 is disconnected from the boring head 7 and is withdrawn from the perforated tube which is then open to receive a full supply of water from the surrounding stratum for discharge to the surface by a suitable pump located, for example, within the shaft, or to receive water from the surface for discharge into the neighboring stratum.

If, during the projecting operation, the mouth of the boring head becomes clogged with clay or stones, for example, or if it is desired to wash the gravel or like material, or if an obstruction is encountered, a jet of water may be forced through the imperforate tube and the slots in the boring head.

If the head of water in the ground above the boring head is not sufficient to maintain an automatic inflow of the sand and water along the interior tube 15 the latter may be attached, at its rear end within the shaft, to a suction pump preferably through the medium of a driving head within the shaft which operates to impose the necessary force upon the boring head to perform the boring operation.

Such driving head may consist of a block 16 (Figure 10) having a central bore 17 communicating at one end with the rear end of the sand discharge tube and at its other end with another bore 18 formed within the block and opening to the side of the block where connection is made with the vacuum pump (not shown) for the discharge of the sand and water. Preferably the rear end of the sand discharge pipe is connected to a sleeve 19 which has a sliding fit within the said block and an annular resilient ring or buffer 20 is provided between the rear end of this sleeve and a flange 21 formed within the block whereby a fluid tight joint is always maintained between the sand discharge tube and the vacuum pump. The said block of the driving head may be rotatable in order to vary the angle at which the sand and water is delivered therefrom to the vacuum pump.

An annular chamber 22 is formed between the interior sand discharge tube 15 and the exterior perforated screening tube 6, which chamber serves to accommodate a packing sleeve 23 (Figures 5 and 5a) which, during the boring operation, maintains a fluid tight joint between the perforated tube and the interior of the shaft and thus ensures that the full head of water outside the shaft may be utilized to flush the sand from the boring head through the interior discharge tube into the shaft for subsequent removal therefrom.

This packing sleeve may be slidably mounted upon the outside of the sand discharge tube and be provided on its outer periphery with one or more resilient rings 24, of rubber for instance, disposed longitudinally of the sleeve within annular recesses 25 thereon, the rings being held in these recesses by means of wire 26, for example, wound tightly around the outer periphery of a portion 24ª of each ring which is of reduced diameter and which reduced portion is followed by an outwardly flared free portion 24ᵇ the external diameter of which is normally greater than the internal diameter of the perforated tube so that this free portion engages tightly along its outer peripheral surface with the inside of the perforated tube. The outwardly flared free portions 24ᵇ of the resilient rings upon the sliding packing sleeve are directed towards the forward end of the collecting or discharge head, and the arrangement is such that, when building up each collecting or discharge head from sections of perforated and imperforate tubes as each set of sections is secured to the previously projected set, the packing sleeve together with the resilient rings carried thereby can be retracted along the previously projected imperforate tube section so as to engage with the new set of tube sections within the central shaft.

The sliding packing sleeve, at its forward end, may be fitted with a further resilient ring 27, of rubber for example, which has an inwardly directed free hollow conical portion 27a adapted to maintain a fluid tight joint with the sand tube. The perforated and imperforate tubes, together with the sliding packing sleeve thereon, may be passed through stuffing boxes 28 (Figure 4) provided around the shaft openings 3, and such stuffing boxes may each be fitted with an internal resilient ring 29 having a forwardly directed free conical portion 29a adapted to engage tightly with the exterior of the perforated tube 6 as the same is projected through its shaft opening and thereby seal the interior of the shaft against the ingress of water thereinto from the neighboring stratum outside the shaft. Each stuffing box may consist of a sleeve 28 which, at its forward end is screwed into a sleeve 30 projecting slightly beyond each shaft opening and is secured to the latter by welding for example and this second sleeve may be fitted with a screw plug 4 which is ejected from the sleeve by engagement of the boring head therewith when the latter is projected at the commencement of the boring operation. The sleeve of the stuffing box may be formed in two parts 28, 28a connected together by an outer collar 28b so as to grip between them the said packing ring 29. By providing for the maintenance of fluid tight joints between the moving parts of each collecting or discharge head it is ensured that the full head of the water outside the shaft is utilized to flush the sand from the boring head through the sand discharge tube and into the interior of the shaft. When a perforated screening tube has been projected to the desired extent, the sand discharge tube associated therewith is disconnected from the boring head, and withdrawn from the perforated screening tube which may then be flushed and backwashed to remove therefrom, and from the gravel surrounding the outside of the screening tube, any remaining sand, so as to leave a gravel pack around the outside of the screening tube which may effectively admit the incoming water.

The rear end of each perforated tube is provided with a valve 31 (Figure 1) whereby the flow of the water along each such tube can be independently controlled and each such tube is also fitted with a pipe 32 by which water may be supplied to the interior of the perforated tube in order to back-wash the same when it is desired to cleanse the screening tube after the removal of the sand discharge tube. Each valve 31 may be arranged to be controlled by an upwardly extending operating spindle 33 which is accessible from a stage or platform 34 within the shaft and each back-wash water pipe 32, which may be removable, may also extend upwardly within the shaft and through such platform into the portion of the shaft above it.

When boring into exceptionally fine material, such as running sand, it is desirable to provide a valve 35 (Figure 6) within the boring head which closes to prevent ingress of sand into the water supply when the sand discharge tube has been withdrawn from the screening tube. Under such conditions during the boring operation, the forward end 36 of the sand discharge tube may be formed to project into the interior of the boring head where it holds the valve 35 within the latter open, against the action of a spring 36, in order to permit the sand and water to flow through the discharge tube during such operation. This valve may consist of a plate pivoted at 35a to the inside of the hollow interior of the boring head and when the sand discharge pipe is withdrawn the valve automatically closes, by the action of its spring, the opening within the boring head by which the latter may have communication with the sand discharge tube.

The forward end of the sand discharge tube 15 may be formed with an externally screw-threaded portion 15a (Figure 5a) for engagement with an internally screw-threaded bore 15b (Figure 6) at the wide end of the boring head and which bore communicates with the hollow interior of the boring head. This bore may be provided within an extension 37 of the wide end of the boring end which is of reduced diameter than that of such wide end and this extension may be screw-threaded externally, as indicated at 6a, to receive a correspondingly threaded portion 6b on the forward end of the perforated screening tube, which, when screwed in position upon the boring head, may abut against the peripheral portion 38 of the wide end of the boring head which projects beyond such extension. The external diameter of the perforated screening tube is preferably of less diameter than that of the wide end of the boring head in order that friction upon this tube may be relieved.

In some cases, particularly when boring into fine sand, the screening tube may be provided within another screening tube 39 (Figures 5 and 5a) having fine slots or slits longitudinally thereof and preferably in staggered relationship.

When it is desired to obtain water from or deliver water to porous or fissured rock, channels or tunnels are made in the material radiating, for example, from a central shaft sunk into the ground and each such channel or tunnel is provided at the end thereof adjacent to the shaft with a valve 31 (Figure 1) whereby the flow of water through each channel may be independently controlled, if necessary, through the medium of a pressure or vacuum pump according to whether it is desired to supply water to or deliver water from the channels.

When recharging the subterranean formations with apparatus according to the invention the water supply may be filtered, by passing through sand filters for example, and conducted to the central shaft down which the water is allowed to flow for discharge through the lateral discharging heads under its own head, the water passing rapidly into the porous subterranean formations on account of the large distributing area provided by the apparatus. Should silt be carried into the gravel adjacent to the screens, the upper water supply is shut off and the system is allowed to produce for a time and this may be assisted by allowing a pulsating motion of the water within the screens which removes the silt.

In cases where there is a bed of saturated sand or gravel near the ground surface, screen pipes may be pushed out into this bed and the water allowed to pass down the central shaft into lower screens within the deeper gravel beds so as to by-pass the impervious clay bed or beds usually present above the deeper gravel beds.

Water delivered from the subterranean formations by the installations and methods according to this invention is clear, since it is already filtered by passage through the subterranean gravel and sand, while surface pollution is impossible since a seal is placed around the shaft above the water producing stratum and adjacent to an impervious clay bed so that there can be no vertical communication between the collecting heads and the surface.

Where it is desired to obtain water from a river, a shaft is sunk near to the river and collecting heads are pushed out into the gravel beds beneath the river bed with the result that clear filtered water is obtained. Should the bed of the river be silty then the collecting heads may be back-washed periodically so that the fine material above the heads is washed upwards into the river and carried away thereby while the gravel settles down and forms a gravel pack around the perforated collecting heads.

When back-washing the collecting heads there is a surge of water in a direction opposite to the normal water flow which re-arranges the fine particles lodged among the grains around or within the perforations in the collecting heads so that the same pass readily into the shaft when the normal water flow resumes.

As above indicated, apparatus according to the invention may be employed for the purpose of replenishing or supplying subterranean formations with water.

The invention contemplates using a part of the head of water between the supply source and the point of discharge to the subterranean formations in order to generate a supply of power.

For instance, according to the invention, water may be transferred from a surface or other water bearing stratum from which the water would ordinarily be lost by flow or evaporation or other causes to a deeper stratum in which it may be conserved for use and in transferring this water a part of the head between the two strata is utilized to generate a supply of electrical power.

This may be achieved by forming the central shaft 1 with openings adjacent to the strata between which a transfer of water is to take place and by projecting a collecting head 55 (Figure 11), or series thereof, through the upper shaft openings into the upper stratum and a discharge head, or series thereof through the lower shaft openings into the lower stratum. The collecting head delivers water to a pipe 56 which extends downwardly within the shaft to a water turbine therein for generating a supply of electric power and from which turbine the water is discharged into the lower portion of the shaft for delivery through the discharge head 57, or heads, into the lower stratum.

The invention also extends to a method of and apparatus for driving pipes and cylinders through earth material such, for example, as for the purpose of forming sewer or telephone tubes or even tunnels several feet in diameter under a river bed.

In carrying out this method pressure is exerted on one end of a pipe or cylinder and a part or all of the material within the path of the pipe, and/or of the area adjacent thereto, is selectively removed. This removed material is passed through said pipe to a point of easy accessibility. The material adjacent to the path of said pipe is loosened and the remaining material is selectively deposited about the pipe which is advanced to occupy all or part of the space in the earth created by the removal of earth material. While it is preferable to remove material from near the advancing end of the pipe or cylinder provision may be made for the selective removal of additional material along the pipe as it advances, both to facilitate the advancement and to increase the porosity of the material adjacent to the pipe or cylinder. To facilitate the removal of material through the pipe I utilize the head of water in the earth to carry the material along. Where this is insufficient a vacuum may be applied to the material-carrying pipe, this vacuum being transmitted to the openings through which the material enters the removal conduit and out into the material to increase the head and flow of water.

Ordinarily, the finer material is removed from the path of the tube to leave the coarser material (gravel, stones and the like) deposited along the tube, thus increasing the porosity of the ground adjacent to the tube. To separate the fine material from the coarse the whole body of material in the path of the tube and adjacent thereto may be kept in motion while such separation is being made. The coarse material is moved outward by engagement with the cone-shaped or tapering head at the end of the tube while the fine material is carried inwards, through the pores of the coarse material, by the action of the water entering the discharge conduit. The tube itself may be blank, but is preferably perforated along all or part of its length, especially just in advance of the forward end. Fine material which does not enter through the holes in the conical head of the advancing tube is thus allowed to enter the tube along its length, the forward motion of the tube through the earth causing the gravel stones to roll where in contact with the tube. This rolling motion separates the sand from the gravel and allows it to pass through the perforations and into the tube, from which all or part is removed through the discharge conduit. Any part not so removed is washed from the tube later, for example, by water or air. Sand is removed from the tube (through the discharge conduit) periodically to ease the pressure of the earth or the tube and facilitate the forward motion of the same.

When obstacles, such as boulders, are encountered by the advancing tube or cylinder they are undermined, dug around and dislodged by the removal of material thereabout, after which the advancement of the pipe continues. In cases where the simple removal of material by the flow of water, under its own head and the added artificial head caused by the vacuum applied, is impractical, then water is forced under pressure out through the material-inlet holes at the forward end of the pipe and thus removes sufficient material to allow the pipe to push its way past the obstruction.

The direction taken by the forward end of the advancing pipe may be changed by removing more earth material from the side of the pipe toward which it is desired that the pipe should incline. For example, if it is desired that the pipe should bear downwards more material is removed from the under side, at or near the forward end of the boring head by, for example, providing the latter with larger slots in the bottom thereof. If on the other hand it is desired that the forward end of the pipe should incline upwards more material is removed from above the path of the pipe, at or near the forward end thereof.

To fully utilize the head of water in the earth and the vacuum and the stream of water forced against the material, the material-laden water is conducted from near the forward end of the advancing pipe through a conduit within the pipe, back to a point of easy accessibility. Where the conduit is a separate pipe within the cylinder being advanced, the annular space between the conduit and the cylinder is maintained closed against the escape of water. Earth material is withdrawn from the extreme end of the advancing pipe or from a desired distance behind the forward end thereof at will and a change is made from one point of extraction to another as conditions dictate.

If it is desirable to render impermeable (to water) the formation adjacent to the cylinder at any point along its path, clay, cement or like material is injected through the discharge conduit at that point, before further advancing or withdrawing the cylinder. To anchor the end of the cylinder, sufficient cement or like material is injected through the discharge conduit to form the desired anchor. To build a solid wall about the advanced cylinder cement or the like is injected through the cylinder, out through holes in the wall thereof and into the surrounding earth material which has been made more porous by the removal of part thereof. This may be made of any desired thickness. After injection the cement or other material is allowed to solidify. To build a relatively large impervious or solid structure about the tube the same is advanced more slowly, all necessary means being used to remove the finer earth material and thus greatly increase the porosity of the ground for a considerable distance from the tube. The pores of the ground surrounding the tube are then impregnated with cement or the like for a considerable distance around the tube. Two or more tubes may be placed near enough together so that the impregnation from one meets the impregnation from the other. When three or more of such structures, properly spaced, are made, the earth material surrounded by the group may be excavated to form a tunnel or shaft. Where a tunnel or shaft of relatively small diameter is desired, the tube itself is used for such shaft or tunnel. Where a somewhat larger shaft or tunnel is desired enough cement, clay or like material is injected out into the formation surrounding the tube so that the desired shaft or tunnel may be driven in the said injected material after it has solidified.

An apparatus suitable for the purpose of carrying out the operations above described is illustrated in Figure 12 in particular and comprises a tube, pipe or cylinder 58 which is pushed into the earth material, said tube being formed preferably in sections that may be joined together, and being either plain or having perforations 59 along its length, particularly near the forward end. The tube may be made from metal, concrete, wood or the like.

At the forward end of the tube 58 there is provided a boring head 60 adapted to move forward through the earth, preferably but not necessarily having at least one inclined surface, said head preferably having one or more apertures 61 therethrough for the passage of earth material. These apertures may or may not be closable. When closable, the closure of all or part of the apertures on one side of the central axis of the head causes the head and the tube to veer away in the opposite direction. The apertures for the admission of material may have vanes, ridges or bosses 62 thereabout to lift the coarser material away from the head and allow the fine material thereamong to pass therefrom and into the apertures along with water flowing therethrough. The head may be slightly larger in diameter than the tube attached at the rear thereof. In the construction illustrated a large aperture 63 is provided at the rear end of the head to cooperate with the discharge conduit 64 which conducts water and earth material to a place of easy accessibility. The aperture 63 may be adapted to be closed if desired.

The discharge conduit 64 extends from the forward end of the tube 58 and is disposed within the same, and the conduit leads to a point where earth material removed therethrough may be discharged. The forward end of the discharge conduit may be connected directly to the head on the forward end of the tube, so that earth material entering through the apertures of the head passes directly therefrom into and along the discharge conduit. When desired a vacuum applied at the opposite end of the discharge conduit operates through the conduit, the head and the apertures therethrough and out into the earth formation to create a flow of water and earth material along the tube. When desired, a strong current or jet of water may be applied at the free end of the discharge conduit so as to pass along the conduit to and into the head, out through the apertures thereof and against the earth material thereabout.

At one or more points along the discharge conduit, and particularly at a point therealong in advance of the boring head, there may be provided one or more portholes 65 in the wall of the discharge conduit. These portholes may be opened and closed at will, for example, by sliding the discharge conduit backwards and forwards. The opening of the ports permits the escape of sand from the interior of the tube 58 into the discharge conduit 64 and therethrough to a point of easy accessibility. This action relieves the pressure on the tube in that vicinity and consequently throughout the length of the tube being advanced. If the tube is being pushed horizontally, the end thereof may be made to rise by leaving the portholes in the discharge conduit open during the pushing operation since a large amount of sand (all from the top side) will then enter the tube. Since a much smaller amount of sand is being removed from below the tube, the tube will, as stated, accordingly rise.

It will be seen therefore that the invention is not restricted in its application to the obtaining of water from the subterranean formation or to the replenishing of the same with water but that the invention may be otherwise applied such, for instance, for the other purposes above mentioned.

For instance by the use of the invention it is possible to push sewer pipes through ballast under a street, and likewise telephone and cable conduits, without disturbing the soil or foundations of nearby buildings.

A further application of the invention as above described consists in consolidating gravel and sand filled with water so that tunnels may be driven through the same without the use of compressed air as is usual.

With the present invention a screen pipe may be pushed out into the sand and ballast and enough of the fine material withdrawn during the projecting process to increase the porosity of the surrounding material from 40 per cent. to 45 per cent. consisting mainly of stones half an inch in diameter and upwards. Grout or heavy material may be forced out through the apertures of the screen pipe into this material and the material thus solidified.

Having now particularly described and ascertained the nature of my said invention and in what manner the same is to be performed, I declare that what I claim is:—

1. A water handling structure comprising a substantially vertically disposed wall of a lined excavation into the earth having a plurality of closable openings through the lining thereof, the interior of said wall being subject to substantially atmospheric pressure and the exterior of said wall being subject to the hydrostatic pressure of the water in the ground, means for inserting tubes through said openings without disturbing said pressures, comprising perforated tubes extending through said openings and into adjacent earth formations, a perforated conical head on the forward end of each tube through which water is adapted to pass, means for preventing the flow of water between said opening and said tube, a permeable earth-supporting medium more permeable than the undisturbed earth, about each tube, means for individually controlling the flow from each tube at the accessible end thereof, and means for operating said control.

2. A water handling structure as claimed in claim 1, in which the perforations in the conical head are wider than the perforations in the tube.

3. A water handling structure as claimed in claim 1, and means for backwashing each tube.

4. A method of operating a perforated tube in a water handling structure such as described herein comprising a vertically disposed wall with projecting valved perforated tubes including the steps of closing the valve on the tube, injecting a current of fluid behind said valve, dislodging the fine particles about said tube, and then opening said valve and flushing said fine particles from the tube.

5. A method of operating a perforated tube in a water handling structure such as described herein comprising a vertically disposed wall with a horizontally disposed valved perforated tube where said tube extends into the earth below a body of surface water, including the steps of building an earth-supporting gravel pack in contact with said tube, forcing a current of water outward through the perforations of said tube into the earth material about and above said tube to carry the fine particles of said earth material upward substantially at right angles to the axis of the tube and away from the immediate vicinity of the tube.

6. A method of operating a water handling structure such as described herein, comprising a vertically disposed wall with projecting valved perforated tubes including the steps of supplying water to the structure for transfer through the perforated tubes and into earth formations to loosen the sand adjacent the perforated tubes and then withdrawing the sand and water through said tubes.

7. A method of operating a water handling structure as claimed in claim 6, in which the water supplied is obtained from earth strata separated from the stratum into which it is distributed.

8. A method of operating a water handling structure as claimed in claim 6, in which the supplied water is obtained on the surface of the ground.

9. A method of operating a water handling structure as claimed in claim 6, in which a part of the head of the supplied water is utilized for the generation of power.

10. A water handling structure as claimed in claim 1, in which tunnels in the earth are substituted for one or more tubes.

11. A water handling structure as claimed in claim 1, in which tunnels in the earth are substituted for one or more tubes with earth supporting media.

12. An apparatus for recovering flowing earth mixtures comprising a central vertically disposed chamber, the interior thereof being subject to substantially normal atmospheric pressure, means for inserting tubes through a wall of said chamber without disturbing said pressure, one or more substantially horizontally disposed tubes extending through and from the wall of said chamber and into the material to be recovered, said tubes being subjected to the hydrostatic pressure of the water in the ground thereabout, sealing means to prevent the ingress of water about said tubes where they pass through the walls of said chamber, and means to control individually the flow of material from each tube, each of said tubes having perforations spaced in the wall thereof, the size and spacing of said perforations being such as to recover an earth mixture at a desired rate for the head of water available.

13. An apparatus for recovering flowing earth mixtures of the character set forth in claim 12 including means for backwashing each tube.

14. A method of operating an apparatus including a substantially vertically disposed wall with a substantially horizontally disposed tube extending through the lower part of said wall comprising the steps of backwashing said tube, thereby rearranging the earth particles in said tube and adjacent thereto, then reversing the flow in said tube and producing the flowing earth mixture therefrom.

15. A method of removing sand or silt adjacent a substantially horizontally disposed perforated tube extending into the earth from the lower part of an open chamber, comprising the step of allowing a surrounding sand or silt material to accumulate about the tube, agitating such accumulation in a water bath until it flows freely, causing said material to enter the tube through the perforations thereof and removing said material through the tube by fluid pressure.

16. A water handling structure comprising a chamber beneath the normal ground level and having a substantially vertical wall, a perforated tube extending through said wall and having a closable opening normally subject to atmospheric pressure within the chamber, and a permeable earth supporting medium about said tube comprising a gravel pack, said gravel pack being formed by depositing a supply of gravel above said perforated tube.

17. A method of operating a water handling structure including a perforated tube below the normal level of the ground, which consists in extending said tube horizontally into the earth from a point substantially below ground water level but at substantially atmospheric pressure, agitating the accumulation of fine solid material adjacent the tube in a water bath until said material flows freely, withdrawing said material into said tube, and removing said material therefrom by fluid pressure.

18. A method of operating a water handling structure including a perforated tube below the normal level of the ground, which consists in positioning said tube from a point of substantially normal atmospheric pressure horizontally in the earth at a point substantially below ground water level and subject to the hydrostatic pressure thereof, agitating the accumulation of fine solid material adjacent the tube in a water bath until said material flows freely, withdrawing said material into said tube, removing said material therefrom by utilizing the weight of the ground water above the tube to flush the tube against atmospheric pressure.

19. A method of operating a water handling structure including a perforated tube below the normal level of the ground, which consists in extending said tube horizontally into the earth from a point substantially below the ground water level but subject to approximately normal atmospheric pressure, the perforated portion of the tube being subject to the hydrostatic pressure of the water in the ground adjacent thereto, agitating the accumulation of fine solid material adjacent the tube in a water bath until said material flows freely, withdrawing said material through said tube, by utilizing the artificial head of water to flush the tube and its surrounding medium by fluid pressure at the outer end of the tube against normal atmospheric pressure at the inner end of the tube.

20. A water handling structure below ground water level in the earth comprising a radiating, ultra-permeable, horizontal gravel bed formed in situ by the extraction of fine material from said gravel, said gravel bed supporting the water-bearing earth material, and in the center of the gravel bed a tube perforated for the admission of water thereinto, a central chamber, means for passing said tube through the lining of said central chamber with said tube being sealed against said lining, and said tube controlled by a valve within the chamber, the interior of said chamber being subject to substantially atmospheric pressure and the exterior of said chamber and tubes being subject to the hydrostatic pressure of the water in the ground.

21. A water handling structure as claimed in claim 20, including a backwash pipe communicating with said tube between said gravel bed and said valve.

22. A water handling structure as claimed in claim 20 in which said valve is equipped with an elongated stem extending above ground water level.

23. A water handling apparatus below normal ground water level in the earth comprising a series of radiating, horizontal, ultra-permeable earth-supporting flow channels subject to the hydrostatic pressure of the water in the ground thereabout, each channel having in the center thereof a tube with walls perforated for the passage of water therethrough, each tube penetrating the lining of a central chamber and sealed against said lining, the interior of said central chamber being subject to substantially normal atmospheric pressure during the penetration of the lining, and each tube controlled at its inner end, within the chamber, by a control valve.

24. A water handling structure as claimed in claim 23 in which each tube at its outer end is equipped with means to prevent the entrance of earth particles into the end of the tube.

LEO RANNEY.